United States Patent Office 2,844,510
Patented July 22, 1958

2,844,510

PHOSPHORIC ACID DERIVATIVES OF 1-PHENYL-2,3-DIMETHYL-4-AMINO-5-PYRAZOLONE

Walter Lorenz and Hans Henecka, Wuppertal-Elberfeld, Germany, assignors to Schenley Industries, Inc., New York, N. Y., a corporation of Delaware No Drawing. Application December 4, 1956
Serial No. 626,073

6 Claims. (Cl. 167—65)

The present invention relates to new derivatives of 1-phenyl-2,3-dimethyl-4-amino-5-pyrazolone and more particularly to chemotherapeutically active derivatives thereof containing combined phosphoric acid.

Compounds of the general formula

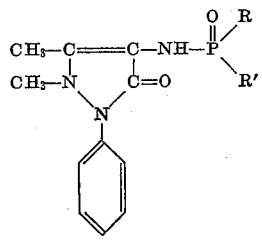

wherein R is an alkoxy- or dialkylamino radical and R' designates a dialkylamino radical, have not been described so far. In the radicals R and R' the alkyl groups may have from one to four carbon atoms, i. e., they may be methyl, ethyl, propyl or butyl.

These derivatives of 1-phenyl-2,3-dimethyl-4-amino pyrazolone (5) may be obtained according to the invention by reacting this amine with bis-(dialkylamino)-phosphoric acid- or dialkylamino alkylphosphoric acid chlorides in the presence of an acid binding agent, such as triethylamine, in an inert organic solvent. The new compounds possess an antipyretic, antiphlogistic, antiallergic and analgesic activity. Their antiphlogistic and antiallergic potency is higher than that of the known 1-phenyl-2,3-dimethyl-4-amino-5-pyrazolone.

It is an object of the present invention to provide derivatives of antipyrine having reduced toxicity. Further objects of the invention consist in the provision of new therapeutic agents, containing amidopyrine and derivatives of antipyrine containing combined phosphoric acid. Still further objects will become apparent as the following specification proceeds.

The main advantage of the claimed compounds consists in their reduced toxicity in comparison with the known derivatives of 1-phenyl-2,3-dimethyl-4-aminopyrazolone-(5). Thus, for instance the 1-phenyl-2,3-dimethyl-4-amino-5-pyrazolone-N-phosphoric acid ethyl ester dimethyl amide is five times as well tolerated than the 1-phenyl-2,3-dimethyl-4-dimethylamino-5-pyrazolone.

Example 1

61 grams (0.3 mol) of 1-phenyl-2,3-dimethyl-4-amino pyrazolone-(5) and 40 grams of triethylamine are dissolved in 480 cc. of toluene. After the addition of 3 grams of zinc dust 65 grams (0.375 mol) of bis-dimethylamino phosphoric acid chloride are dropped thereto at 80° C. and the mixture is kept for 20 hours at water bath temperature. The reaction product becomes red. After the addition of some animal charcoal the solution is sucked off from the triethylamine hydrochloride formed and cooled. The 1-phenyl-2,3-dimethyl-4-amino-5- pyrazolone-N-phosphoric acid bis-dimethylamide, which crystallises, is sucked off and recrystallised from toluene. Colourless needles, which are insoluble in water, are obtained of the melting point 173° C. The yield amounts to 38 grams.

Example 2

61 grams (0.3 mol) of 1-phenyl-2,3-dimethyl-4-amino pyrazolone-(5) and 40 grams of triethylamine are dissolved in 480 cc. of benzene. After the addition of 3 grams of zinc dust 65 grams of dimethylamino phosphoric acid ethyl ester chloride are dropped thereto at 80–90° C. The reaction product is heated in the water bath over night. After cooling the triethyl amine hydrochloride is sucked off, the benzene solution is washed with 10% sodium carbonate solution, dried over calcium carbonate and the solvent is distilled off in vacuo not exceeding 40° C. The residue crystallises and a yellow powder, which can be recrystallised from ethyl acetate, is obtained. The 1-phenyl-2,3-dimethyl-4-amino-5-pyrazolone-N-phosphoric acid ethyl ester dimethyl amide is easily soluble in water and melts at 132° C. The yield amounts to 31 grams.

The new compounds of this application are especially suitable for use in the treatment of chronic inflammations in combination with amidopyrine. For clinical application, for instance the compound of the following formula

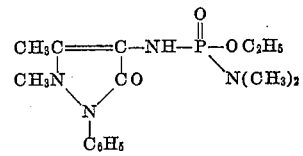

is employed in a sterile aqueous solution, which solution contains 1.8 grams of the 1-phenyl-2,3-dimethyl-4-amino-5-pyrazolone-N-phosphoric acid ethyl ester dimethyl amide and 0.6 gram of amidopyrine in 5 milliliters. It is also possible to employ the compound in the form of sugar coated pills or in gelatine capsules containing 0.4 gram each of active substance consisting of 0.3 gram of 1-phenyl-2,3-dimethyl-4-amino-5-pyrazolone-N-phosphoric acid ethyl ester dimethyl amide and 0.1 gram of amidopyrine.

The pharmacological properties of amidopyrine are known. In the treatment of chronic inflammations it is especially valuable for its analgesic and antiphlogistic activity.

1-phenyl-2,3-dimethyl-4-amino-5-pyrazolone - N - phosphoric acid ethyl ester dimethyl amide showed in animal tests a lesser analgesic activity but a remarkable antiphlogistic activity. The adrenal cortex is activated by the compounds of this invention. For instance, a dose of 30 milliliters of the compound of Example 2 per kg. of rat upon intraperitoneal application decreases the eosinophiles in the blood by about one half.

Tests in rabbits of the compound of Example 2 showed a remarkable antipyretic potency in doses of 10 mg./kg. I. P.

The general compatibility of the compounds is good. The medium lethal dose in mice and rats upon oral or intraperitoneal application is higher than 2.0 g./kg., and even intravenously 1.0 g./kg. were tolerated by mice. Generally the acute toxicity of the compounds is five times smaller than that of amidopyrine. Chronical toxicity data were tested by daily intramuscular doses of 0.2 g./kg. for a fortnight in rabbits and cats. The urine and blood picture were unaltered after this time, also the body weight and the general behaviour of the animals.

In rabbits, an injection of 0.5 milliliter of a 30% solution of the compound of Example 2 showed no visible modifications or functional disturbance of the leg upon dissection.

For clinical application the combination of amidopyrine with the compounds of this invention is especially valuable since the effect is observed earlier and is prolonged. The local and general compatibility is improved over amidopyrine. The therapeutical application of the new combination products is especially advisable in chronic inflammations in which their antiphlogistic and analgesic properties are desirable. For instance polyarthritis, arthrosis deformans, oesteochondroses, like periarthritis hum.scap., epicondylitis, spondylosis, myalgia, morbus Bechterew are favourably influenced.

The new combination products of this invention are in general injected intramuscularly, on ampoule of 5 milliliters being applied in intervals of several days. In special cases a slow intravenous injection can be employed. For prolonged medication oral application is often preferable. For starting the therapy two sugar coated pills are given three times per day.

We claim:

1. A compound selected from the group consisting of 1 - phenyl - 2,3 - dimethyl - 4 - amino - 5 - pyrazolone-N-phosphoric acid bis-dilower alkyl amides and 1-phenyl-2,3-dimethyl-4-amino-5-pyrazolone - N - phosphoric acid ethylester dilower alkyl amides.

2. 1 - phenyl - 2,3 - dimethyl - 4 - amino - 5 - pyrazolone-N-phosphoric acid bis-dimethyl amide.

3. 1 - phenyl - 2,3 - dimethyl - 4 - amino - 5 - pyrazolone-N-phosphoric acid ethyl ester dimethyl amide.

4. As a chemotherapeutical agent a mixture of amidopyrine and a compound selected from the group consisting of 1-phenyl-2,3-dimethyl-4-amino-5-pyrazolone-N-phosphoric acid bis-dilower alkyl amides and 1-phenyl-2,3-dimethyl-4-amino-5-pyrazolone - N - phosphoric acid ethylester dilower alkyl amides.

5. As a chemotherapeutical agent a mixture of amidopyrine and 1-phenyl-2,3-dimethyl-4-amino-5-pyrazolone-N-phosphoric acid bis-dimethyl amide.

6. As a chemotherapeutical agent a mixture of amidopyrine and 1-phenyl-2,3-dimethyl-4-amino-5-pyrazolone-N-phosphoric acid ethyl ester dimethyl amide.

References Cited in the file of this patent

UNITED STATES PATENTS

| | | |
|---|---|---|
| 2,662,894 | Tonutti et al. | Dec. 15, 1953 |
| 2,744,912 | Gaillot et al. | May 8, 1956 |